US012667815B2

(12) United States Patent
Lucas et al.

(10) Patent No.: US 12,667,815 B2
(45) Date of Patent: Jun. 30, 2026

(54) CONTAINERIZED SYSTEM FOR MIXING DRY ADDITIVES WITH BULK MATERIAL

(71) Applicant: Halliburton Energy Services, Inc., Houston, TX (US)

(72) Inventors: Bryan Chapman Lucas, Duncan, OK (US); Wesley John Warren, Duncan, OK (US); Calvin L Stegemoeller, Duncan, OK (US); Austin Carl Schaffner, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 933 days.

(21) Appl. No.: 17/963,325

(22) Filed: Oct. 11, 2022

(65) Prior Publication Data

US 2023/0035652 A1    Feb. 2, 2023

Related U.S. Application Data

(62) Division of application No. 16/089,745, filed as application No. PCT/US2016/033949 on May 24, 2016, now Pat. No. 11,498,037.

(51) Int. Cl.
B01F 23/60         (2022.01)
B01F 35/21         (2022.01)
(Continued)

(52) U.S. Cl.
CPC .......... B01F 23/69 (2022.01); B01F 35/2112 (2022.01); B01F 35/22162 (2022.01);
(Continued)

(58) Field of Classification Search
CPC ........................... B01F 35/71731; B01F 23/69
See application file for complete search history.

(56) References Cited

U.S. PATENT DOCUMENTS 710,611 A    10/1902    Ray
802,254 A    10/1905    Baker
(Continued)

FOREIGN PATENT DOCUMENTS

DE         917646 C        9/1954
EP         2937826 A1     10/2015
(Continued)

OTHER PUBLICATIONS

Foreign Communication from Related Application—Canadian Office Action, regarding Application No. CA2996055, dated Oct. 2, 2020, 5 pages.

(Continued)

*Primary Examiner* — Elizabeth Insler
(74) *Attorney, Agent, or Firm* — Conley Rose, P.C.; Rodney B. Carroll

(57)         ABSTRACT

In accordance with presently disclosed embodiments, systems and methods for efficiently handling dry additives to be mixed with bulk material in a blender are provided. The systems may include a support structure used to direct bulk material from one or more portable containers on the support structure to a first outlet location, and a combined metering/transferring system for directing dry additives from another portable container to a second outlet location. Specifically, the metering/transferring system may output a metered flow of dry additives to the blender mixer to be combined with bulk material that is released from the portable containers. The metering/transferring system may utilize a gravity feed outlet coupled to a metered screw or other conveying device to move the dry additive from the portable container to the second outlet location.

21 Claims, 5 Drawing Sheets

14

(51) Int. Cl.

| | |
|---|---|
| *B01F 35/221* | (2022.01) |
| *B01F 35/71* | (2022.01) |
| *E21B 21/06* | (2006.01) |
| *E21B 41/00* | (2006.01) |
| *E21B 43/26* | (2006.01) |
| *B01F 101/49* | (2022.01) |
| *B65G 15/00* | (2006.01) |
| *B65G 33/08* | (2006.01) |

(52) U.S. Cl.
CPC ...... *B01F 35/71731* (2022.01); *E21B 21/062* (2013.01); *E21B 41/00* (2013.01); *B01F 2101/49* (2022.01); *B65G 15/00* (2013.01); *B65G 33/08* (2013.01)

(56) References Cited

U.S. PATENT DOCUMENTS

| | | | |
|---|---|---|---|
| 1,519,153 | A | 12/1924 | Mitton |
| 1,726,603 | A | 9/1929 | Allen |
| 1,795,987 | A | 3/1931 | Adams |
| 2,231,911 | A | 2/1941 | Hitt et al. |
| 2,281,497 | A | 4/1942 | Hyson et al. |
| 2,385,245 | A | 9/1945 | Willoughby |
| 2,415,782 | A | 2/1947 | Zademach et al. |
| 2,513,012 | A | 6/1950 | Dugas |
| 2,563,470 | A | 8/1951 | Kane |
| 2,652,174 | A | 9/1953 | Shea et al. |
| 2,670,866 | A | 3/1954 | Glesby |
| 2,678,737 | A | 5/1954 | Mangrum |
| 2,703,659 | A | 3/1955 | Hutchins |
| 2,756,073 | A | 7/1956 | Bridge |
| 2,759,737 | A | 8/1956 | Manning |
| 2,802,603 | A | 8/1957 | McCray |
| 2,867,336 | A | 1/1959 | Soldini et al. |
| 3,049,248 | A | 8/1962 | Teltzel et al. |
| 3,083,879 | A | 4/1963 | Coleman |
| 3,151,779 | A | 10/1964 | Rensch et al. |
| 3,203,370 | A | 8/1965 | Haug et al. |
| 3,217,927 | A | 11/1965 | Bales, Jr. et al. |
| 3,315,826 | A | 4/1967 | Gardner |
| 3,318,473 | A | 5/1967 | Jones et al. |
| 3,326,572 | A | 6/1967 | Murray |
| 3,343,688 | A | 9/1967 | Ross |
| 3,354,918 | A | 11/1967 | Coleman |
| 3,380,333 | A | 4/1968 | Clay et al. |
| 3,404,963 | A | 10/1968 | Fritsche et al. |
| 3,410,530 | A | 11/1968 | Gilman |
| 3,432,151 | A | 3/1969 | O'Loughlin et al. |
| 3,467,408 | A | 9/1969 | Regalia |
| 3,476,270 | A | 11/1969 | Cox et al. |
| 3,602,400 | A | 8/1971 | Cooke |
| 3,627,555 | A | 12/1971 | Driscoll |
| 3,698,693 | A | 10/1972 | Poncet |
| 3,785,534 | A | 1/1974 | Smith |
| 3,802,584 | A | 4/1974 | Sackett, Sr. et al. |
| 3,986,708 | A | 10/1976 | Heltzel et al. |
| 4,023,719 | A | 5/1977 | Noyon |
| 4,058,239 | A | 11/1977 | Van Mill |
| 4,138,163 | A | 2/1979 | Calvert et al. |
| 4,178,117 | A | 12/1979 | Brugler |
| 4,204,773 | A | 5/1980 | Bates |
| 4,248,337 | A | 2/1981 | Zimmer |
| 4,258,953 | A | 3/1981 | Johnson |
| 4,313,708 | A | 2/1982 | Tiliakos |
| 4,395,052 | A | 7/1983 | Rash |
| 4,395,128 | A | 7/1983 | Mathis et al. |
| 4,398,653 | A | 8/1983 | Daloisio |
| 4,423,884 | A | 1/1984 | Gevers |
| 4,544,279 | A | 10/1985 | Rudolph |
| 4,548,507 | A | 10/1985 | Mathis et al. |
| 4,583,663 | A | 4/1986 | Bonerb |
| 4,626,166 | A | 12/1986 | Jolly |
| 4,701,095 | A | 10/1987 | Berryman et al. |
| 4,802,141 | A | 1/1989 | Stegemoeller et al. |
| 4,806,065 | A | 2/1989 | Holt et al. |
| 4,850,702 | A | 7/1989 | Arribau et al. |
| 4,854,714 | A | 8/1989 | Davis et al. |
| 4,856,681 | A | 8/1989 | Murray |
| 4,900,157 | A | 2/1990 | Stegemoeller et al. |
| 4,919,540 | A | 4/1990 | Stegemoeller et al. |
| 4,956,821 | A | 9/1990 | Fenelon |
| 4,993,883 | A | 2/1991 | Jones |
| 4,997,335 | A | 3/1991 | Prince |
| 5,036,979 | A | 8/1991 | Selz |
| 5,096,096 | A | 3/1992 | Calaunan |
| 5,114,169 | A | 5/1992 | Botkin et al. |
| 5,149,192 | A | 9/1992 | Hamm et al. |
| 5,339,996 | A | 8/1994 | Dubbert et al. |
| 5,343,813 | A | 9/1994 | Septer |
| 5,375,730 | A | 12/1994 | Bahr et al. |
| 5,401,129 | A | 3/1995 | Eatinger |
| 5,413,154 | A | 5/1995 | Hurst, Jr. et al. |
| 5,426,137 | A | 6/1995 | Allen |
| 5,441,321 | A | 8/1995 | Karpisek |
| 5,443,350 | A | 8/1995 | Wilson |
| 5,445,289 | A | 8/1995 | Owen |
| 5,590,976 | A | 1/1997 | Kilheffer et al. |
| 5,609,417 | A | 3/1997 | Otte |
| 5,722,552 | A | 3/1998 | Olson |
| 5,772,390 | A | 6/1998 | Walker |
| 5,806,441 | A | 9/1998 | Chung |
| 5,913,459 | A | 6/1999 | Gill et al. |
| 5,915,913 | A | 6/1999 | Greenlaw et al. |
| 5,927,356 | A | 7/1999 | Henderson |
| 5,944,470 | A | 8/1999 | Bonerb |
| 5,997,099 | A | 12/1999 | Collins |
| 6,059,372 | A | 5/2000 | McDonald et al. |
| 6,112,946 | A | 9/2000 | Bennett et al. |
| 6,126,307 | A | 10/2000 | Black et al. |
| 6,193,402 | B1 | 2/2001 | Grimland et al. |
| 6,247,594 | B1 | 6/2001 | Garton |
| 6,379,086 | B1 | 4/2002 | Goth |
| 6,425,627 | B1 | 7/2002 | Gee |
| 6,491,421 | B2 | 12/2002 | Rondeau et al. |
| 6,517,232 | B1 | 2/2003 | Blue |
| 6,536,939 | B1 | 3/2003 | Blue |
| 6,537,015 | B2 | 3/2003 | Lim et al. |
| 6,568,567 | B2 | 5/2003 | McKenzie et al. |
| 6,622,849 | B1 | 9/2003 | Sperling |
| 6,655,548 | B2 | 12/2003 | McClure, Jr. et al. |
| 6,876,904 | B2 | 4/2005 | Oberg et al. |
| 6,980,914 | B2 | 12/2005 | Bivens et al. |
| 7,008,163 | B2 | 3/2006 | Russell |
| 7,086,342 | B2 | 8/2006 | O'Neall et al. |
| 7,100,896 | B1 | 9/2006 | Cox |
| 7,114,905 | B2 | 10/2006 | Dibdin |
| 7,252,309 | B2 | 8/2007 | Eng Soon et al. |
| 7,284,579 | B2 | 10/2007 | Elgan et al. |
| 7,320,539 | B2 * | 1/2008 | Christenson ............ B01F 27/62 366/14 |
| 7,451,015 | B2 | 11/2008 | Mazur et al. |
| 7,475,796 | B2 | 1/2009 | Garton |
| 7,500,817 | B2 | 3/2009 | Furrer et al. |
| 7,513,280 | B2 | 4/2009 | Brashears et al. |
| 7,665,788 | B2 | 2/2010 | Dibdin et al. |
| 7,762,281 | B2 | 7/2010 | Schuld |
| 7,997,213 | B1 | 8/2011 | Gauthier et al. |
| 8,387,824 | B2 | 3/2013 | Wietgrefe |
| 8,434,990 | B2 | 5/2013 | Claussen |
| D688,349 | S | 8/2013 | Oren et al. |
| D688,350 | S | 8/2013 | Oren et al. |
| D688,351 | S | 8/2013 | Oren et al. |
| D688,772 | S | 8/2013 | Oren et al. |
| 8,505,780 | B2 | 8/2013 | Oren |
| 8,545,148 | B2 | 10/2013 | Wanek-Pusset et al. |
| 8,573,917 | B2 | 11/2013 | Renyer |
| 8,585,341 | B1 * | 11/2013 | Oren .................... B65D 90/587 414/407 |
| 8,607,289 | B2 | 12/2013 | Brown et al. |
| 8,616,370 | B2 | 12/2013 | Allegretti et al. |
| 8,622,251 | B2 | 1/2014 | Pren |
| 8,662,525 | B1 | 3/2014 | Dierks et al. |
| 8,668,430 | B2 | 3/2014 | Oren et al. |

(56) References Cited

U.S. PATENT DOCUMENTS

| | | | |
|---|---|---|---|
| D703,582 S | 4/2014 | Oren |
| 8,827,118 B2 | 9/2014 | Yen |
| 8,834,012 B2 | 9/2014 | Case et al. |
| 8,840,298 B2 | 9/2014 | Stegemoeller et al. |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Pren |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Pren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1 | 10/2017 | Oren |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2 | 5/2018 | Oren et al. |
| 9,988,182 B2 | 6/2018 | Allegretti et al. |
| 10,059,246 B1 | 8/2018 | Oren |
| 10,081,993 B2 | 9/2018 | Walker et al. |
| 10,189,599 B2 | 1/2019 | Allegretti et al. |
| 10,207,753 B2 | 2/2019 | O'Marra et al. |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2 | 12/2019 | Oren et al. |
| 10,604,338 B2 | 3/2020 | Allegretti |
| 2002/0121464 A1 | 9/2002 | Soldwidh-Zoole et al. |
| 2003/0159310 A1 | 8/2003 | Hensley et al. |
| 2004/0008571 A1 | 1/2004 | Coody et al. |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 | 1/2007 | Diosse et al. |
| 2007/0201305 A1* | 8/2007 | Heilman ............... E21B 43/267 |
| | | | 366/141 |
| 2008/0187423 A1 | 8/2008 | Mauchle et al. |

| | | | |
|---|---|---|---|
| 2008/0257449 A1 | 10/2008 | Weinstein et al. |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0314791 A1 | 12/2009 | Hartley et al. |
| 2010/0196129 A1 | 8/2010 | Buckner |
| 2010/0319921 A1 | 12/2010 | Eia et al. |
| 2011/0061855 A1 | 3/2011 | Case et al. |
| 2012/0017812 A1 | 1/2012 | Renyer et al. |
| 2012/0018093 A1 | 1/2012 | Zuniga et al. |
| 2012/0037231 A1 | 2/2012 | Janson et al. |
| 2012/0181093 A1 | 7/2012 | Fehr et al. |
| 2012/0219391 A1 | 8/2012 | Teichrob et al. |
| 2013/0128687 A1 | 5/2013 | Adams |
| 2013/0135958 A1 | 5/2013 | O'Callaghan |
| 2013/0142601 A1 | 6/2013 | McIver et al. |
| 2013/0284729 A1 | 10/2013 | Cook et al. |
| 2014/0023463 A1 | 1/2014 | Oren |
| 2014/0023464 A1 | 1/2014 | Oren et al. |
| 2014/0041322 A1 | 2/2014 | Pham et al. |
| 2014/0044508 A1 | 2/2014 | Luharuka et al. |
| 2014/0069650 A1 | 3/2014 | Stegemoeller et al. |
| 2014/0076569 A1 | 3/2014 | Pham et al. |
| 2014/0083554 A1 | 3/2014 | Harris |
| 2014/0216736 A1 | 8/2014 | Leugemors et al. |
| 2014/0299226 A1 | 10/2014 | Oren et al. |
| 2014/0305769 A1 | 10/2014 | Eiden, III et al. |
| 2014/0377042 A1 | 12/2014 | McMahon |
| 2015/0003943 A1 | 1/2015 | Oren et al. |
| 2015/0003955 A1 | 1/2015 | Oren et al. |
| 2015/0016209 A1 | 1/2015 | Barton et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0280476 A1 | 9/2016 | Stegemoeller et al. |
| 2016/0332809 A1 | 11/2016 | Harris |
| 2016/0332811 A1 | 11/2016 | Harris |
| 2017/0021318 A1 | 1/2017 | McIver et al. |
| 2017/0123437 A1 | 5/2017 | Boyd et al. |
| 2017/0129696 A1 | 5/2017 | Yen |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217353 A1 | 8/2017 | Vander Pol et al. |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267145 A1 | 9/2017 | Oren |
| 2017/0283165 A1 | 10/2017 | Oren et al. |
| 2017/0313497 A1 | 11/2017 | Schaffner et al. |
| 2017/0320660 A1 | 11/2017 | Sanders et al. |
| 2017/0327326 A1* | 11/2017 | Lucas ............... B01F 35/71731 |
| 2017/0334639 A1* | 11/2017 | Hawkins ................ B65D 90/48 |
| 2017/0349226 A1 | 12/2017 | Oren et al. |
| 2018/0201437 A1 | 7/2018 | Surjaatmadja et al. |
| 2018/0257814 A1 | 9/2018 | Allegretti et al. |
| 2019/0009231 A1 | 1/2019 | Warren et al. |
| 2019/0111401 A1 | 4/2019 | Lucas et al. |

(56)                References Cited

U.S. PATENT DOCUMENTS

| | | | |
|---|---|---|---|
| 2019/0241356 A1 | 8/2019 | Schaffner et al. |
| 2020/0062448 A1 | 2/2020 | Allegretti et al. |

FOREIGN PATENT DOCUMENTS

| | | | |
|---|---|---|---|
| GB | 2066220 | A | 12/1980 |
| GB | 2204847 | A | 11/1988 |
| JP | 2008239019 | A | 10/2008 |
| WO | 2008012513 | A2 | 1/2008 |
| WO | 2013095871 | A1 | 6/2013 |
| WO | 2013142421 | A1 | 9/2013 |
| WO | 2014018129 | A1 | 1/2014 |
| WO | 2014018236 | A2 | 1/2014 |
| WO | 2014165632 | A2 | 10/2014 |
| WO | 2015006732 | A1 | 1/2015 |
| WO | 2015119799 | A1 | 8/2015 |
| WO | 2015191150 | A1 | 12/2015 |
| WO | 2015192061 | A1 | 12/2015 |
| WO | 2016044012 | A1 | 3/2016 |
| WO | 2016160067 | A1 | 10/2016 |
| WO | 2016178691 | A1 | 11/2016 |
| WO | 2016178692 | A1 | 11/2016 |
| WO | 2016178694 | A1 | 11/2016 |
| WO | 2016178695 | A1 | 11/2016 |
| WO | 2017014768 | A1 | 1/2017 |
| WO | 2017014771 | A1 | 1/2017 |

OTHER PUBLICATIONS

Foreign Communication from Related Application—International Search Report and Written Opinion of the International Searching Authority, International Application No. PCT/US2016/033949, dated Feb. 16, 2017, 14 pages.

* cited by examiner

CONTAINERIZED SYSTEM FOR MIXING DRY ADDITIVES WITH BULK MATERIAL

CROSS REFERENCE TO RELATED APPLICATIONS

This application is a divisional of and claims priority to U.S. patent application Ser. No. 16/089,745 filed Sep. 28, 2018 which is a filing under 35 U.S.C. 371 of International Application No. PCT/US2016/033949 filed May 24, 2016, both of which are incorporated by reference herein in their entirety.

TECHNICAL FIELD

The present disclosure relates generally to transferring bulk materials, and more particularly, to a system and method for handling and mixing dry additives with bulk material transported in portable containers.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material (bulk material) is normally transported to a well site in a commercial or common carrier tank truck. Once the tank truck and mixing system are at the well site, the bulk material must be transferred or conveyed from the tank truck into a supply tank for metering into a blender as needed. Well sites typically include one or more supply tanks that are filled pneumatically on location and then connected to the blender through a series of belts (or auger conveyors in some marine applications). The supply tanks provide a large connected capacity of bulk material to be supplied to the blender. Discharge gates on the supply tanks output bulk material from the supply tanks to the conveyors, which then transfer the bulk material to the blender.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. For certain wellbore treatments, it can be desirable to provide large volumes of dry additives for mixing with the bulk material in the blender.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
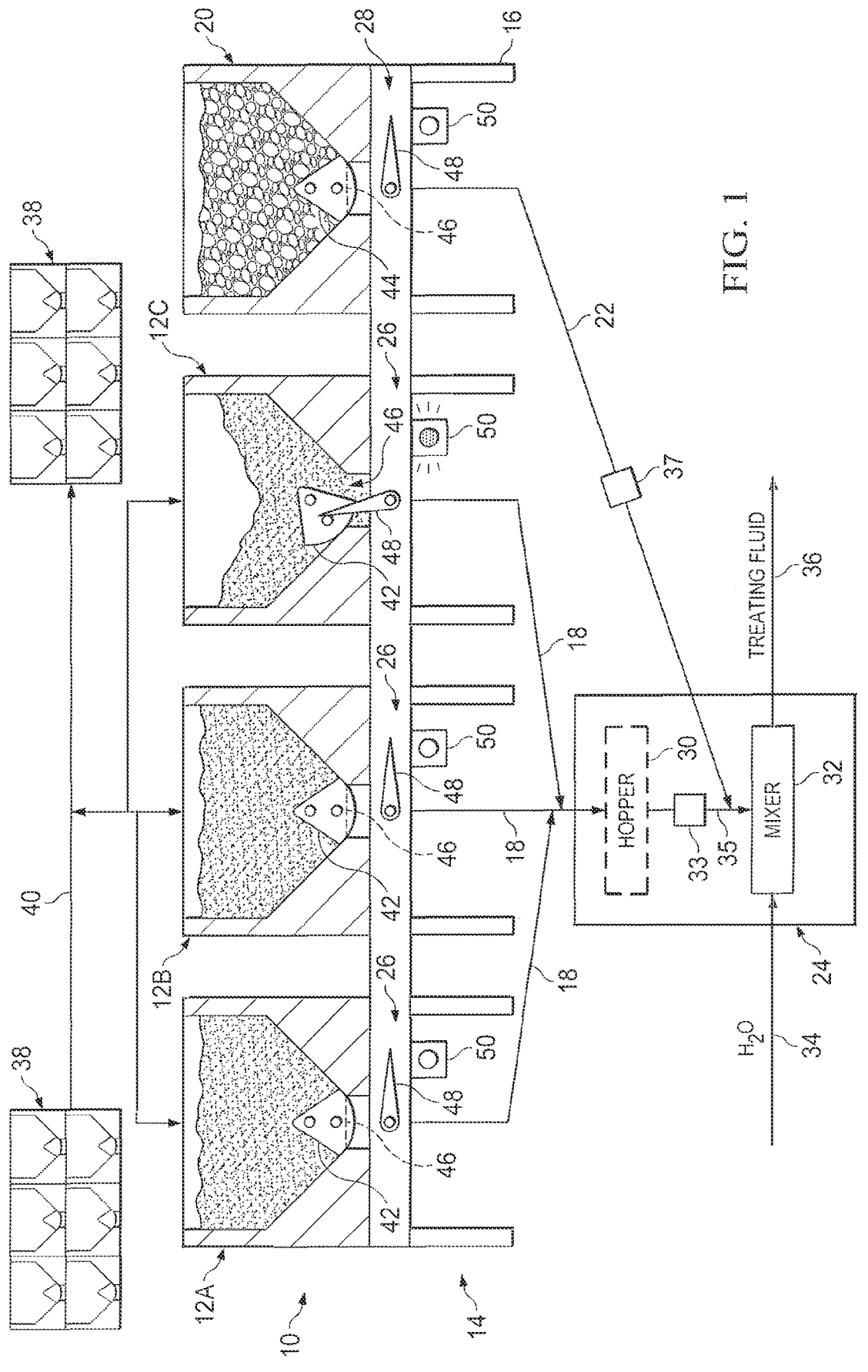
FIG. 1 is a schematic block diagram of a bulk material/dry additive handling system suitable for releasing bulk material and dry additives from portable containers for mixing, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others.

The disclosed embodiments are directed to systems and methods for efficiently handling dry additives to be mixed with bulk material in a blender. The systems may include a support structure used to direct bulk material from one or more portable containers on the support structure to a first outlet location, and a combined metering/transferring system for directing dry additives from another portable container to a second outlet location. Specifically, the metering/transferring system may output a flow of dry additives to a blender unit for mixing with the bulk material that is released from the portable containers. The disclosed techniques may be used to efficiently handle any desirable bulk material having a solid or liquid constituency including, but not limited to, sand, proppant, gel particulate, dry-gel particulate, and others. The dry additive may be any desirable dry material. In general, the dry additive may be different from the bulk material being used, including but not limited to diverting agent, breaker material, and others.

In currently existing on-site material handling applications, bulk material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container toward a desired destination, such as a hopper on a blender unit.

With currently existing equipment, there is not an efficient way to handle metering of large dry additives into the mixing compartment of the blender unit for combining with bulk material released from portable containers. Typically, small volume (e.g., around 50 lb) bags of dry additive can be cut and manually lifted over a screw feeder leading to the blender mixing compartment. The dry additive falls from the bag into the hopper and/or is metered via a screw feeder to the blender mixer. In other instances, large volume (e.g., around 2000-3000 lb) super sacs of dry additive can be lifted by a crane or other overhead lifting means and cut to dump the contents into a hopper of a transferring device, then metered to the mixer. These existing methods of introducing dry additive into the blender can generate large amounts of dust as the bags of dry additive are dumped into the hoppers. In addition, if a large volume of dry additive is needed for forming a particular treatment fluid, the process of cutting, lifting, and dumping from bags may have to be repeated several times throughout the operation. This can be time consuming and distracting for an operator tending the blender unit. The dry additives are also susceptible to adverse weather conditions when added in this manner.

The disclosed systems and methods for metering and blending dry additives into bulk material are designed to address and eliminate the shortcomings associated with existing container handling systems. Specifically, the disclosed systems and methods involve using a support structure designed to provide a gravity feed of bulk material from one or more portable containers to a blender location, and to provide a flow of dry additive material from another portable container for mixing with the bulk material in the blender.

The support structure includes a frame that holds the portable bulk material containers and the portable dry additive containers in an elevated position above the outlet locations. The frame may include multiple individual bays, each configured to hold a portable container. One or more bays are designed to hold containers of bulk material and an additional bay is designed to hold a container (which could be a modular container) of one or more dry additives. The support structure also includes one or more gravity feed outlets (e.g., chutes) coupled to and extending downward from the frame to route bulk material from the portable containers directly to a first outlet location. The support structure further includes a dry additive outlet system that directs the dry additive from the portable container on the support structure to a second outlet location. In some embodiments, this transfer of dry additive from the portable container to the second outlet location could be performed at a predetermined or metered flow rate. The dry additive outlet system may utilize a gravity feed outlet coupled to a metered screw or other conveying device to move the dry additive from the portable container to the second outlet location. Various arrangements of components in the dry additive outlet system may be used and controlled to provide the flow of dry additive to the blender. This allows the blender to mix a desired concentration of bulk material and dry additive to form a treatment fluid.

Turning now to the drawings, FIG. 1 is a block diagram of a bulk material handling system 10. The system 10 includes one or more bulk material containers 12 elevated on a support structure 14 and holding a quantity of bulk material (e.g., solid or liquid treating material). The containers 12 may each utilize a gravity feed to provide a controlled constant supply of bulk material at an outlet 18. The containers 12 are separate from each other and independently transportable about the job site (e.g., for placement on or removal from the support structure 14).

In addition, the system 10 includes at least one dry additive container 20 elevated on the support structure 14 and holding a quantity of dry additive (e.g., diverter materials, breaker material, etc.). The dry additive may be a material having a relatively larger particulate size than that of the bulk material disposed in the bulk material containers 12. The container 20 may utilize a gravity feed to provide a controlled constant supply of dry additive at an outlet 22. The container 20 of dry additive is a separate and portable container that is independently transportable about the job site.

In the illustrated embodiment, the support structure 14 may include a frame 16 for receiving and holding the various containers 12 and 20, a plurality of gravity feed outlets 18 for directing bulk material away from the respective containers 12, and the outlet 22 for directing dry additive away from the corresponding container 20. The frame 16 of the support structure 14 may include separate bays 26 each designed to receive and hold a different container 12 of bulk material, as well as an additional bay 28 for receiving and holding the dry additive container 20. The outlets 18 may be coupled to and extend from the frame 16. The outlets 18 may utilize a gravity feed to provide a controlled constant supply of bulk material from the containers 12 to a first outlet location, such as a bulk material inlet on a blender unit 24. The outlet 22 may utilize at least a gravity feed and a conveying device to provide a controlled constant supply of dry additive from the container 20 to a second outlet location, such as a dry additive inlet on the blender unit 24.

Although the support structure 14 is described herein as supporting containers of dry bulk material on bays 26 and supporting a different dry additive material on the bay 28, it should be noted that the additional bay 28 may in some embodiments also be used to support and provide bulk material to the outlet location. This may be possible since the containers 12 of bulk material and containers 18 of dry additive have the same footprint.

Although shown as just one support structure 14 in FIG. 1, other embodiments of the bulk material handling system 10 may include one or more bulk material containers 12 and/or dry additive containers 20 disposed on separate support structures 14 that all feed into the blender unit 24. For example, the separate support structures 14 may each hold a single bulk material container 12 or dry additive container 20. In other embodiments, the support structures 14 may each hold multiple bulk material containers 12 and/or dry additive containers 20. In still other embodiments, one support structure 14 may hold several bulk material containers 12 while another support structure 14 holds one or more dry additive containers 20.

As mentioned above, the outlets 18 and 22 may direct bulk material and dry additive, respectively, to the blender unit 24. The blender unit 24 may include a hopper 30 and a mixer 32 (e.g., mixing compartment). The blender unit 24 may also include a metering mechanism 33 for providing a controlled, i.e. metered, flow of bulk material from the hopper 30 to the mixer 32. As illustrated, the outlets 18 may provide the bulk material to the blender hopper 30. However, in other embodiments the blender unit 24 may not include the hopper 30, such that the outlets 18 of the support structure 14 may provide bulk material directly into the mixer 32. As shown, the outlet 22 from the fourth bay 28 may provide a constant supply of dry additive to the blender unit 24. The blender unit 24 may mix the dry additive with the bulk material and fluids in the mixer 32. The bulk material and dry additive may be separately metered into a common dry material inlet 35 of the mixer 32.

Water and other additives may be supplied to the mixer 32 (e.g., mixing compartment) through a fluid inlet 34. As those of ordinary skill in the art will appreciate, the fluid inlet 34 may include more than the one input flow line illustrated in FIG. 1. The bulk material, dry additive, and water may be combined in the mixer 32 to produce (at an outlet 36) a hydraulic fracturing fluid, a mixture combining multiple types of proppant, proppant/dry-gel particulate mixture, sand/sand-diverting agents mixture, cement slurry, drilling mud, a mortar or concrete mixture, or any other fluid mixture for use on location. The outlet 36 may be coupled to a pump for transporting the treating fluid to a desired location (e.g., a hydrocarbon recovery well) for a treating process.

It should be noted that the disclosed bulk material containers 12 and dry additive containers 20 may be utilized to provide a bulk material/dry additive mixture for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, the containers 12 and 20 may be elevated above their outlet locations via the frame 16. The support structure 14 is designed to elevate the containers 12 above the level of the blender inlet (e.g., blender hopper 30 and/or mixing tub 32) to allow the bulk material to gravity feed from the containers 12 to the blender unit 24. This way, the containers 12 are able to sit on the frame 16 of the support structure 14 and output bulk material directly into the blender unit 24 via the gravity feed outlets 18 of the support structure 14. The dry additive outlet 22 is integrated into the support structure 14 to direct dry additive from the elevated container 20 to the blender unit 24.

A dry additive metering device 37 may be used to provide the dry additive to the blender mixer 32 at a predetermined, metered rate. In some embodiments, the dry additive metering device 37 may be disposed along the outlet 22, as shown, to direct the dry additive from the container 20 to the blender unit 24 at a predetermined, metered rate. In other embodiments, the metering device 37 may be incorporated into the blender unit 24 (similar to the bulk material metering device 33), so that the dry additive outlet 22 directs a constant supply of dry additive from the container 20 to a dry additive hopper on the blender unit 24, and the metering device 37 disposed on the blender unit 24 provides the dry additive to the mixer 32 at a predetermined, metered rate.

In some embodiments, the support structure 14 (with the frame 16, the gravity feed outlets 18, and the dry additive outlet 22) may be integrated into the blender unit 24. In this manner, the system 10 may be a single integrated unit for receiving bulk material and dry additive containers 12 and 20 on the support structure 14, feeding bulk material and dry additive from the containers 12 and 20 to their respective blender inlets, and combining the bulk material and dry additive with one or more fluids at the mixer 32 to produce the treatment fluid.

Although shown as supporting three containers 12 of bulk material and one container of dry additive 20, other embodiments of the frame 16 may be configured to support other numbers or combinations of containers 12 and 20. The exact number of containers 12 and 20 that the support structure 14 can hold may depend on a combination of factors such as, for example, the volume, width, and weight of the containers 12 and 20 to be disposed thereon. The bays 26 and 28 may be designed to receive containers of bulk material and dry additive, respectively, having approximately the same footprint.

In any case, the containers 12 and 20 may be completely separable and transportable from the frame 16, such that any of the containers 12 and 20 may be selectively removed from the frame 16 and replaced with another container 12 (or 20). That way, once the bulk material or dry additive from one container 12 (or 20) runs low or empties, a new container 12 (or 20) may be placed on the frame 16 to maintain a steady flow of bulk material or dry additive to the outlet locations. In some instances, a container 12 (or 20) may be closed before being completely emptied, removed from the frame 16, and replaced by a container 12 (or 20) holding a different type of bulk material or dry additive to be provided to the outlet location.

It should be noted that the disclosed system 10 may be used in other contexts as well. For example, the bulk material/dry additive handling system 10 may be used in concrete mixing operations (e.g., at a construction site) to dispense aggregate from the containers 12 along with larger aggregate from the additive container 20 into a concrete mixing apparatus (blender 24). In addition, the bulk material/dry additive handling system 10 may be used in agriculture applications to dispense grain, feed, seed, or mixtures of the same. Still other applications may be realized for transporting bulk material and dry additives via containers 12 and 20 to an elevated location on a support structure 14 and dispensing the bulk material and dry additive in a metered fashion to an outlet location.

A portable bulk storage system 38 may be provided at the site for storing one or more additional bulk material containers 12 and/or dry additive containers 20 to be positioned on the frame 16 of the support structure 14. The containers 12 and 20 may be transported to the desired location on a transportation unit (e.g., truck). The bulk storage system 38 may be the transportation unit itself or may be a skid, a pallet, or some other holding area. One or more containers 12 (or 20) may be transferred from the storage system 38 onto the support structure 14, as indicated by arrow 40. This transfer may be performed by lifting the container 12 (or 20) via a hoisting mechanism, such as a forklift, a crane, or a specially designed container management device.

When the one or more containers 12 of bulk material are positioned on the support structure 14, discharge gates 42 on one or more of the containers 12 may be opened, allowing bulk material to flow from the containers 12 into the respective outlets 18 of the support structure 14. The outlets 18 may then route the flow of bulk material directly to an outlet location (e.g., into the hopper 30 or mixer 32 of the blender unit 24). In addition, when it is desired to provide dry additive to the blender unit 24, a discharge gate 44 on the container 20 may be opened, allowing dry additive to flow from the container 20 into the respective outlet 22 of the support structure 14. The outlet 22 may then transfer and/or meter the dry additive to the blender unit 24 for mixing with the bulk material.

After one or more of the containers 12 (or 20) on the support structure 14 are emptied, the empty container(s) 12 (or 20) may be removed from the support structure 14 via a hoisting mechanism. In some embodiments, the one or more empty containers 12 (or 20) may be positioned on another bulk storage system 38 (e.g., a skid, a pallet, or some other holding area) until they can be removed from the site and/or refilled. In other embodiments, the one or more empty containers 12 (or 20) may be positioned directly onto a transportation unit for transporting the empty containers 12 (or 20) away from the site. It should be noted that the same transportation unit used to provide one or more filled containers 12 (or 20) to the location may then be utilized to remove one or more empty containers 12 (or 20) from the site.

As illustrated, the containers 12 and 20 may each include discharge gates 42 and 44 for selectively dispensing or blocking a flow of bulk material and dry additive from the respective containers 12 and 20. In some embodiments, the discharge gates 42 and 44 may each include a rotary clamshell gate, as shown. However, other types of discharge gates 42 and 44 that can be actuated open and closed may be used. When the discharge gates 42 and 44 are closed (as shown on containers 12A, 12B, and 20) the gates 42 and 44 may prevent bulk material/dry additive from flowing from the corresponding containers 12 and 20 to the outlets 18 and 22. The discharge gates 42 and 44 may be selectively actuated into an open position (as shown on container 12C) to release the bulk material/dry additive from the containers 12 and 20.

When rotary clamshell gates are used, this actuation may involve rotating the discharge gate 42 (or 44) about a pivot point relative to the container 12 (or 20) to uncover an opening 46 at the bottom of the container 12 (or 20), thereby allowing bulk material (or dry additive) to flow through the opening 46 and into the outlet 18 (or 22). When linearly actuated gates are used, this actuation may involve linearly translating the discharge gate 42 (or 44) relative to the container 12 (or 20) to uncover the opening 46. When it is desired to stop the flow of bulk material/dry additive, or once the container 12 (or 20) is emptied, the discharge gate 42 (or 44) may then be actuated (e.g., rotated or translated) back to the closed position to block the flow of bulk material/dry additive.

In some embodiments, the support structure 14 may include one or more actuators 48 used to actuate the discharge gates 42 and 44 of whatever containers 12 and 20 are positioned on the support structure 14. The one or more actuators 48 may be entirely separate from the containers 12 and 20 and their corresponding discharge gates 42 and 44. That is, the one or more actuators 48 and the discharge gates 42 and 44 may not be collocated on the same structure. The same actuators 48 may be used to open and/or close the discharge gates 42 and 44 of multiple containers 12 and 20 that are positioned on the support structure 14 over time. The one or more actuators 48 may be rotary actuators, linear actuators, or any other desired type of actuators for engaging and moving the discharge gates 42 and 44 of the containers 12 and 20 between closed and open positions. The actuators 48 may be automated and, in some instances, may allow for manual override of the automated system.

The support structure 14 may also include one or more indicators 50 (e.g., indicator lights) disposed on the support structure 14 for providing various information about the operating state of the support structure 14 and/or the containers 12 and 20 disposed thereon. For example, in the illustrated embodiment, the support structure 14 may include at least one indicator 50 corresponding to each actuator 48 on the support structure 14. The indicators 50 may include lights designed to indicate whether the discharge gates 42 and 44 of the containers 12 and 20 disposed on the different bays 26 and 28 of the support structure 14 are in an open position or in a closed position, based on the operating state of the corresponding actuators 48.

Presently disclosed embodiments are directed to the use of the support structure 14 to direct dry additive to the blender unit 24 to be mixed with the bulk material output from the containers 12 on the support structure 14. As described above, the dry additive may be provided in portable containers 20, similar to the portable containers 12 used for the bulk material.

The dry additive containers 20 may have the same footprint as the bulk material containers 12, in order to enable efficient placement of either type of container 12 or 20 onto the frame 16 of the support structure 14 and in other locations about the job site. Keeping the two types of containers 12 and 20 with the same footprint may enable the containers 12 and 20 to be stacked atop one another at a bulk storage facility 38 or transportation unit. In some embodiments, it may be desirable for the dry additive containers 20 to be a different height (but still the same footprint) than the bulk material containers 12, in order to accommodate a desired volume of dry additive for a particular treatment.

As mentioned above, the dry additive containers 20 may be equipped with a similar discharge gate 44 to those used on the bulk material containers 12. For example, both types of containers 12 and 20 may utilize rotary clamshell gates 42 and 44 that are actuated via the same rotary actuation mechanism (e.g., 48) on the support structure 14. In some embodiments, the dry additive container 20 may include a smaller discharge opening 46 than the bulk material containers 12, due to the shape and constraints of the outlet system 22 used to direct dry additive from the container 20 to the outlet location.

By adding the extra bay 28 to the frame 16 of the support structure 14 and utilizing the same type of hoisting mechanism, base structure actuators 48, and a similar container footprint, the efficiencies that are available for handling the containerized bulk material on location can be extended to handling large dry additive on location as well. The efficient, containerized system may be extended to other types of bulk material/dry additive transfer operations that are commonly used during fracturing operations, and in other contexts as well.

The disclosed bulk material/dry additive handling system 10 provides a more efficient mechanism for providing dry additive to a blender than is currently available using large bags of dry additive simply dumped onto a metering screw. In addition, the disclosed system and method automates the process of directing the dry additive to the blender unit, thereby allowing a blender operator to focus on tasks other than lifting and dumping individual bags of dry additive into the blender. Further, large volumes of dry additive can be metered into the blender mixer as needed without the blender operator having to work under a suspended super sac. Still further, the disclosed system and method provides a nearly dust free operation for introducing dry additive into the blender, as compared to existing techniques. Even if a small amount of dust is temporarily generated on location, it would likely not affect any personnel on location due to the automation of the system, which removes the operator from manually handling bags of dry additive.

Figure 2:
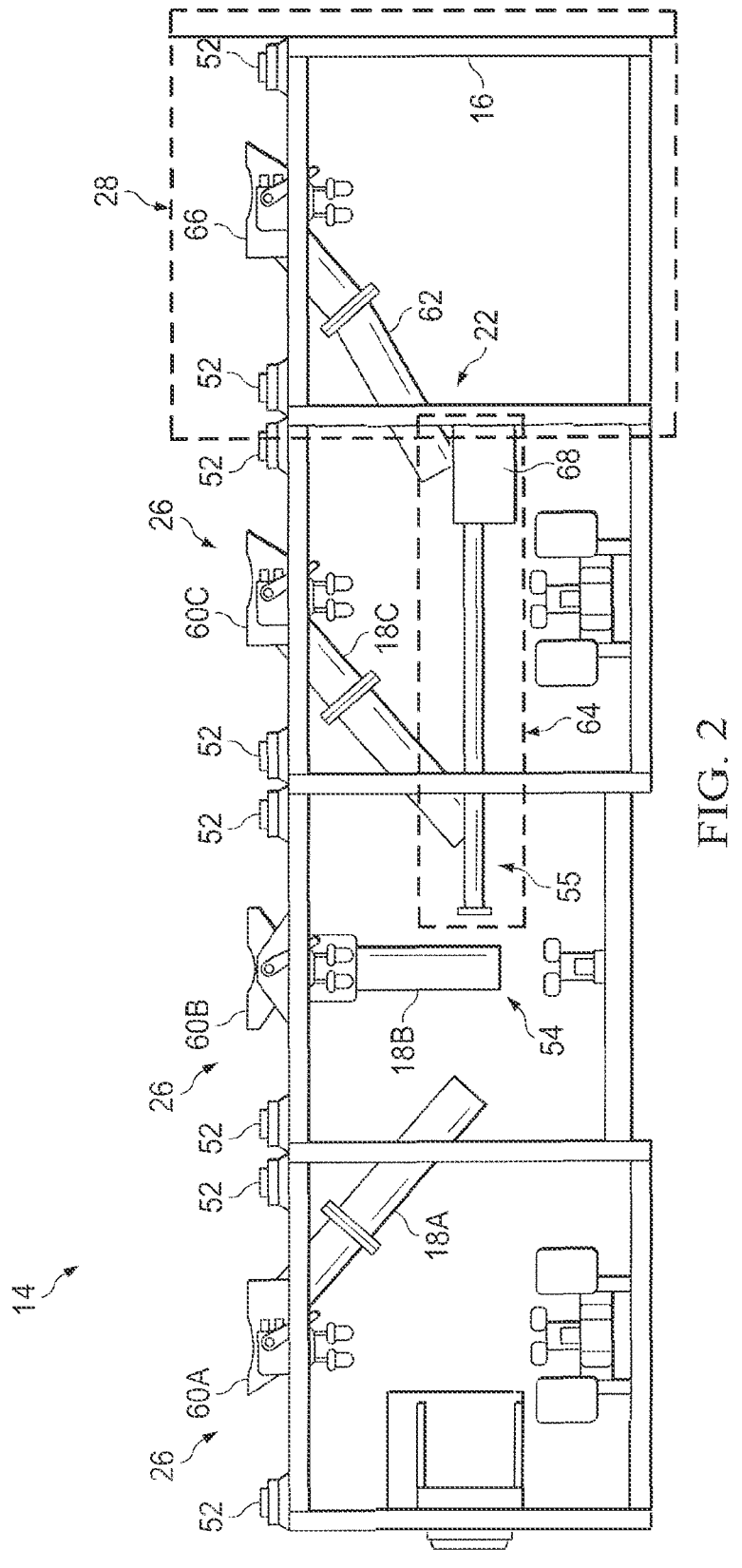
FIG. 2 is a side view of a system for directing dry additives released from a portable container for mixing with bulk material released from other portable containers, in accordance with an embodiment of the present disclosure.

FIG. 2 illustrates an embodiment of the support structure 14 that may be designed to receive multiple bulk material containers and one dry additive container. Specifically, the support structure 14 includes the frame 16 sized to receive and support up to three portable containers of bulk material and one container of dry additive. As illustrated, the frame 16 may include several beams connected together (e.g., via welds, rivets or bolts) to form a continuous group of cubic or rectangular shaped sections coupled end to end. For example, in the illustrated embodiment the frame 16 generally includes one continuous, elongated rectangular body broken into four distinct cubic/rectangular sections. The top of each rectangular section acts as a bay (26 or 28) designed to support a single container.

As illustrated, the support structure 14 may be equipped with a plurality of locator pins 52 disposed on top of the frame 16 for locating and holding the various containers on the frame 16. The bulk material/dry additive containers may include complementary engagement features designed to interface with the locator pins 52, thus enabling a precise placement of the containers into desired locations on the frame 16. In the illustrated embodiment, the locator pins 52 are generally disposed at the corners on the upper face of each bay 26 or 28. However, other placements of the locator pins 52 along the upper surface of the frame 16 may be utilized in other embodiments.

In some embodiments, the support structure 14 may be transportable to and from a desired location on a flatbed trailer or some other transportation unit. Once at location, a hoisting mechanism (e.g., forklift, crane, etc.) may be used to remove the support structure 14 from the transportation system unit and to place the support structure 14 into a desired position. In other embodiments, to further improve the mobility, transportability, and rig-up speed at the job site, the portable support structure 14 may be integrated into a specialized support structure trailer unit with wheels.

As described above, the support structure 14 may include several gravity feed outlets 18 for routing bulk material directly from one or more bulk material containers disposed on the frame 16 to an outlet location 54 (e.g., bulk material inlet of the blender unit). The gravity feed outlets 18A, 18B, and 18C may be used to deliver a flow of bulk material to the outlet location 54 from each of three respective containers disposed on the frame 16. In some embodiments, the support structure 14 may also include individual hoppers 60A, 60B, and 60C at the top of the frame 16 for funneling bulk material from the discharge gate of the corresponding containers into the gravity feed outlets 18A, 18B, and 18C, respectively.

The gravity feed outlets 18A, 18B, and 18C may be chutes positioned so that the upper end of each chute is disposed beneath a discharge gate of a corresponding container (or one of the hoppers 60) on the frame 16. The gravity feed outlets 18 may be positioned such that the lower end of each chute is disposed fully within the outlet location 54 (e.g., a blender hopper or mixer). This allows the gravity feed outlets 18 to provide bulk material from all of the containers positioned on the frame 16 into the same outlet location 54 at the same time. In some embodiments, the outlets 18 are able to provide a gravity feed where an angle of repose of the bulk material exiting the chutes is able to choke the flow of bulk material through the chutes. As bulk material is metered from the outlet location to a downstream location, additional bulk material is able to flow via gravity from the one or more outlets 18 into the outlet location 54. In other embodiments, the outlets 18 and/or the outlet location 54 may feature a metering gate/valve (not shown) used to regulate the amount of bulk material and dry additive provided to a downstream location.

It may be desirable for the outlets 18 to be angled by a certain amount so that the lower ends of the outlets 18 interface directly with the outlet location 54. In some embodiments, the angle of inclination of each gravity feed outlet 18 from a horizontal plane may be between approximately 25 and 55 degrees, between approximately 30 and 50 degrees, between approximately 35 and 45 degrees, or equal to approximately 40 degrees. As shown, it may be desirable to angle the outlets 18 such that outlets 18 direct the bulk material toward an outlet location proximate a relatively central portion of the support structure 14.

The illustrated design of the support structure 14 includes three bays 26 that allow for a maximum of three bulk material containers to be disposed thereon, and three gravity feed outlets 18 for feeding bulk material directly to a first outlet location 54. This three-container arrangement meets various geometrical limitations on the size of the support structure 14 and the angle of inclination of the gravity feed outlets 18 to provide a gravity feed of the bulk material from the containers. The design is sufficient to provide material from the three bulk material containers to the outlet location 54 (e.g., blender hopper) at a desired rate, while providing manageable swap times for removing/replacing empty containers on the support structure 14 and minimizing dust generated on location.

As mentioned above, the disclosed support structure 14 further includes an additional bay 28 (e.g., fourth bay) for receiving and holding a dry additive container, and an outlet system 22 for directing the dry additive from the container on the fourth bay 28 to a second outlet location 55 on the blender. In the illustrated embodiment, the outlet system 22 may include a gravity feed outlet 62 and a conveying device 64 coupled to a discharge end of the gravity feed outlet 62 for routing the dry additive to the second outlet location 55. The gravity feed outlet 62 may be substantially similar to the gravity feed outlets 18 used to direct a flow of bulk material from the other bays 26 on the support structure 14. The support structure 14 may also include a hopper 66 at the top of the bay 28 for funneling dry additive from the discharge gate of the corresponding container into the gravity feed outlet 62. The gravity feed outlet 62 may generally provide a steady feed of dry additive (under the force of gravity) into an inlet 68 of the conveying device 64. The inlet 68 may be a hopper or some other type of receptacle or bin that feeds into the conveying device 64.

The conveying device 64 may include a small belt conveyor, a feed screw, an auger, or some other device designed to meter dry material in a sideways direction. As shown, the conveying device 64 may extend in a substantially horizontal direction from the discharge end of the gravity feed outlet 62 to the second outlet location 55. The conveying device 64 may output the dry additive directly into a second outlet location 55 (e.g., a dry additive blender inlet) that is different from the outlet location 54 where the gravity feed outlets 18 output the bulk material. That way, the dry additive may be maintained separate from the bulk material prior to the bulk material and dry additive being combined in the blender mixer. The conveying device 64 may be controlled to move the dry additive to the second outlet location 55 at a metered rate, so that the dry additive can be combined in a desired ratio with the bulk material in the blender mixer. In this manner, the conveying device 64 may function to both meter and transfer the dry additive from the container to the outlet location 55.

The disclosed system may be controlled to output a desired rate of dry additive to the blender. A controller may output signals to move the actuator 48 on the dry additive bay 28 of the support structure 14 and/or to slow or stop movement of the conveying device 64 to reduce the rate of dry additive sent to the outlet location 55. The system may be designed to handle partial loads of dry additive. For example, if only a portion of the available container volume of dry additive is needed for a treatment fluid, the desired amount of dry additive may be output to the blender using the containerized system. This is unlike existing methods, where the entire contents of a bag of dry additive is emptied into a screw feeder leading to the blender. The disclosed techniques enable an operator to more precisely control the amount of dry additive provided to the blender to form a treatment fluid.

Although the illustrated embodiment shows a single bay 28 and corresponding outlet system 22 to facilitate feeding of dry additive to the outlet location 55, other embodiments may include more than one additional bay 28 and corresponding outlet system 22. For example, in some embodiments, another bay 28 for receiving and holding a dry additive container may be disposed on an opposite side of the support structure 14. That is, the support structure 14 may include three bays 26 for holding bulk material containers flanked on opposite sides by additional bays 28 for holding dry additive containers. This embodiment of the support structure 14 would also include an additional outlet system 22 (e.g., gravity feed outlet 62 plus conveying device 64) extending from the second additional bay 28 to the outlet location 55. This arrangement may enable the system to provide larger amounts of dry additive to the blender and to maintain a connected capacity of dry additive to the blender in the event that one container of dry additive needs to be removed/replaced. The five bay arrangement (three bulk material containers and two dry additive containers) would also still meet the size limitations for transportation of the support structure 14 down the road, for example, on a trailer.

In other embodiments, one or more of the dry additive bays 28 may actually be standalone support structure units that are brought up alongside the three-bay support structure unit to form the illustrated support structure 14. To that end, the bay 28 may include the frame 16 along with the gravity feed outlet 62. The conveying device 64 may be incorporated into the structure having the three bays 26 and later coupled to the discharge end of the gravity feed outlet 62 when the additional bay 28 is brought into position. In other embodiments, the conveying device 64 may be incorporated into the structure having the additional bay 28, and the bay 28 may be brought into a position such that the discharge end of the conveying device 64 is positioned at the dry additive inlet of the blender.

Figure 3:
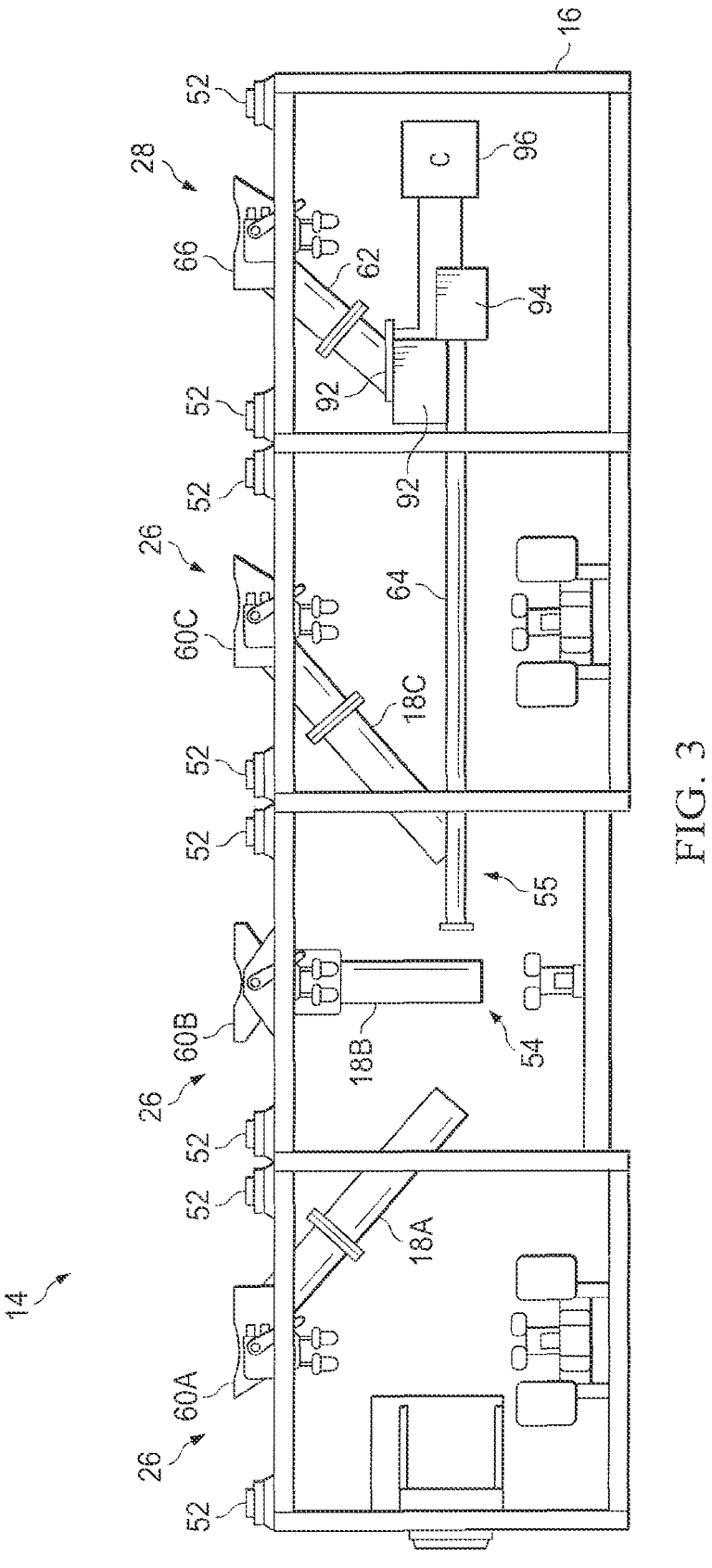
FIG. 3 is a schematic diagram of an embodiment of the system of FIG. 2, in accordance with an embodiment of the present disclosure.
Figure 4:
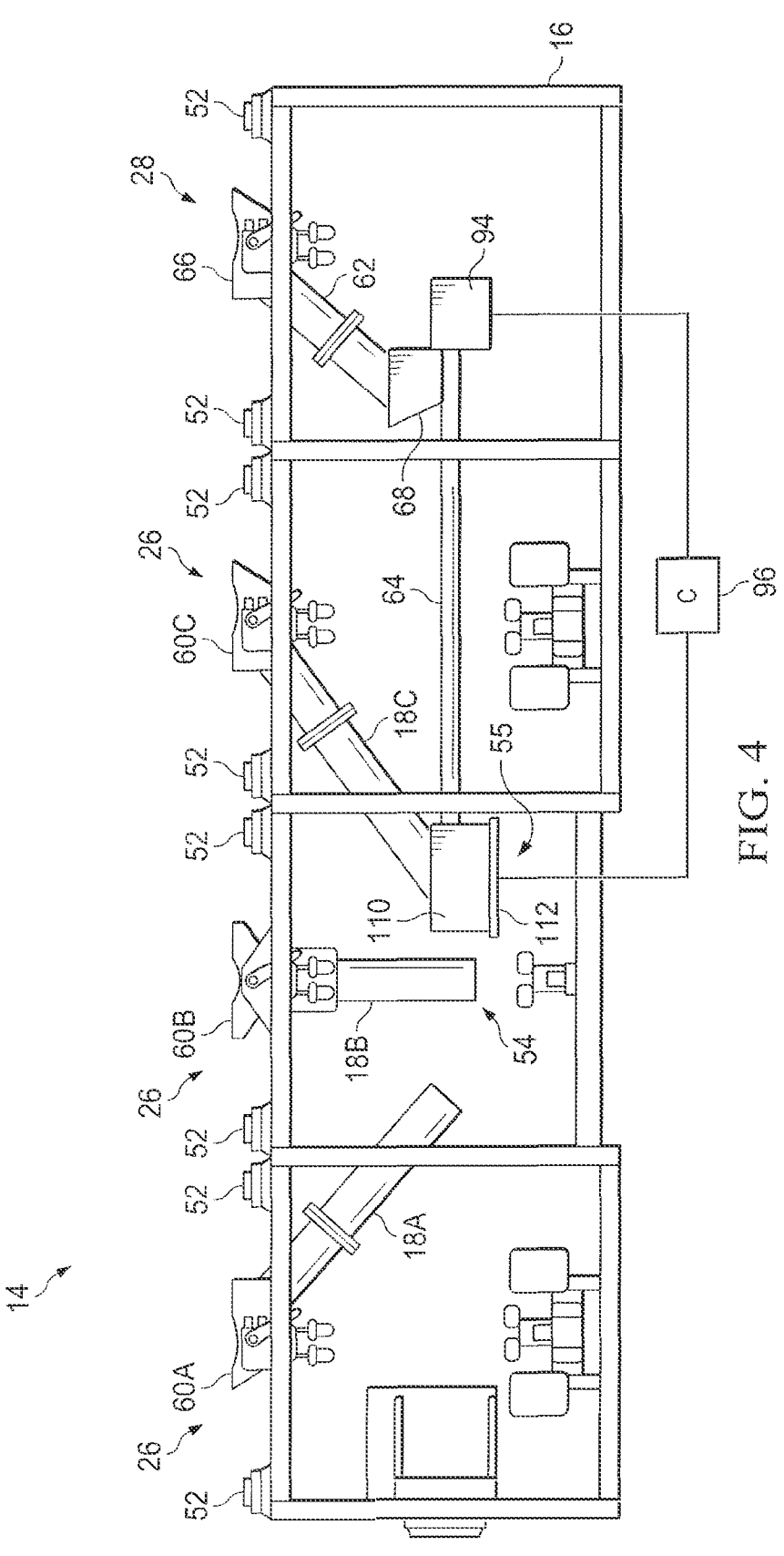
FIG. 4 is a schematic diagram of another embodiment of the system of FIG. 2, in accordance with an embodiment of the present disclosure.

Using just the gravity feed outlet 62 and the conveying device 64 to meet the dry additive rate requirements is adequate for most applications. However, in some treatment fluid applications, it is desirable to drop a very large amount of dry additive into the blender mixer at one time. To accomplish this, the disclosed dry additive outlet system 22 may be adapted to selectively release large amounts of dry additive toward the outlet location 55 in a controlled manner. FIGS. 3 and 4 illustrate two different embodiments of the support structure 14 including these features that allow for providing and/or metering a large volume of dry additive into the blender in a short amount of time.

FIG. 3 illustrates the support structure 14 having the three bulk material container bays 26, the additional dry additive bay 28, and the three gravity feed outlets 18 for directing bulk material to the first outlet location 54. In addition, the support structure 14 includes the outlet system 22 for sending dry additive to the second outlet location 55. As shown, the outlet system 22 may include the gravity feed outlet 62, which feeds to a discharge location 90. The discharge location 90 of the gravity feed outlet 62 may have a relatively large volume for retaining a desired amount of dry additive discharged from the container disposed on the bay 28. The gravity feed outlet 62 may be equipped with a controllable gate 92 at the discharge location 90 that can be selectively actuated to release a large predetermined volume of dry additive from the gravity feed outlet 62 to the conveying device 64. A motor 94 of the conveying device 64 may be controlled to run the conveying device 64 at a very high speed to transfer dry additive released from the gravity feed outlet 62 to the outlet location 55 in a short amount of time.

As illustrated, a control system 96 may be communicatively coupled to both the gate 92 at the bottom of the gravity feed outlet 62 and the motor 94 of the conveying device 64. The control system 96 may output control signals to these components to operate the conveying device 64 at a desired speed (e.g., high speed) when the gate 92 is opened to release a large amount of dry additive.

In other embodiments, the control system 96 may be communicatively coupled to just the gate 92 on the discharge end 90 of the gravity feed outlet 62. The conveying device 64 may be designed to operate at a constant speed. In such embodiments, the controllable gate 92 may function to meter a flow of dry additive toward the blender for mixing with the bulk material, while the conveying device 64 merely functions to transfer the dry additive to the blender.

In another embodiment, as illustrated in FIG. 4, the dry additive outlet system 22 may include a surge bin 110 disposed at a discharge end of the conveying device 64. The surge bin 110 may include a controllable gate 112 that can be selectively actuated to release dry additive that has collected in the surge bin 110 directly into the blender for mixing with the bulk material. In some embodiments, the conveying device 64 may transfer dry additive discharged from the container on the fourth bay 28 to the surge bin 110, where the dry additive may collect until a desired amount is ready to be dumped into the outlet location 55.

As illustrated, a control system % may be communicatively coupled to an actuating component of the gate 112 so that the control system 96 may initiate opening of the gate 112 to release dry additive at a desired time. In some embodiments, the surge bin 110 may include one or more sensors for detecting an amount of dry additive collected in the surge bin 110. The control system 96 may output signals to open the gate 112 once the data from the one or more sensors indicate that a desired amount of dry additive has collected in the surge bin 110. In some embodiments, the control system 96 may also be coupled to the motor 94 of the conveying device 64, as shown, to facilitate a metered transfer of dry additive from the gravity feed outlet 62 to the surge bin 110. In other embodiments, the conveying device 64 may operate at a constant speed, functioning as a dry additive transfer device while the surge bin 110 and controllable gate 112 function to meter the dry additive to the outlet location 55.

Figure 5:
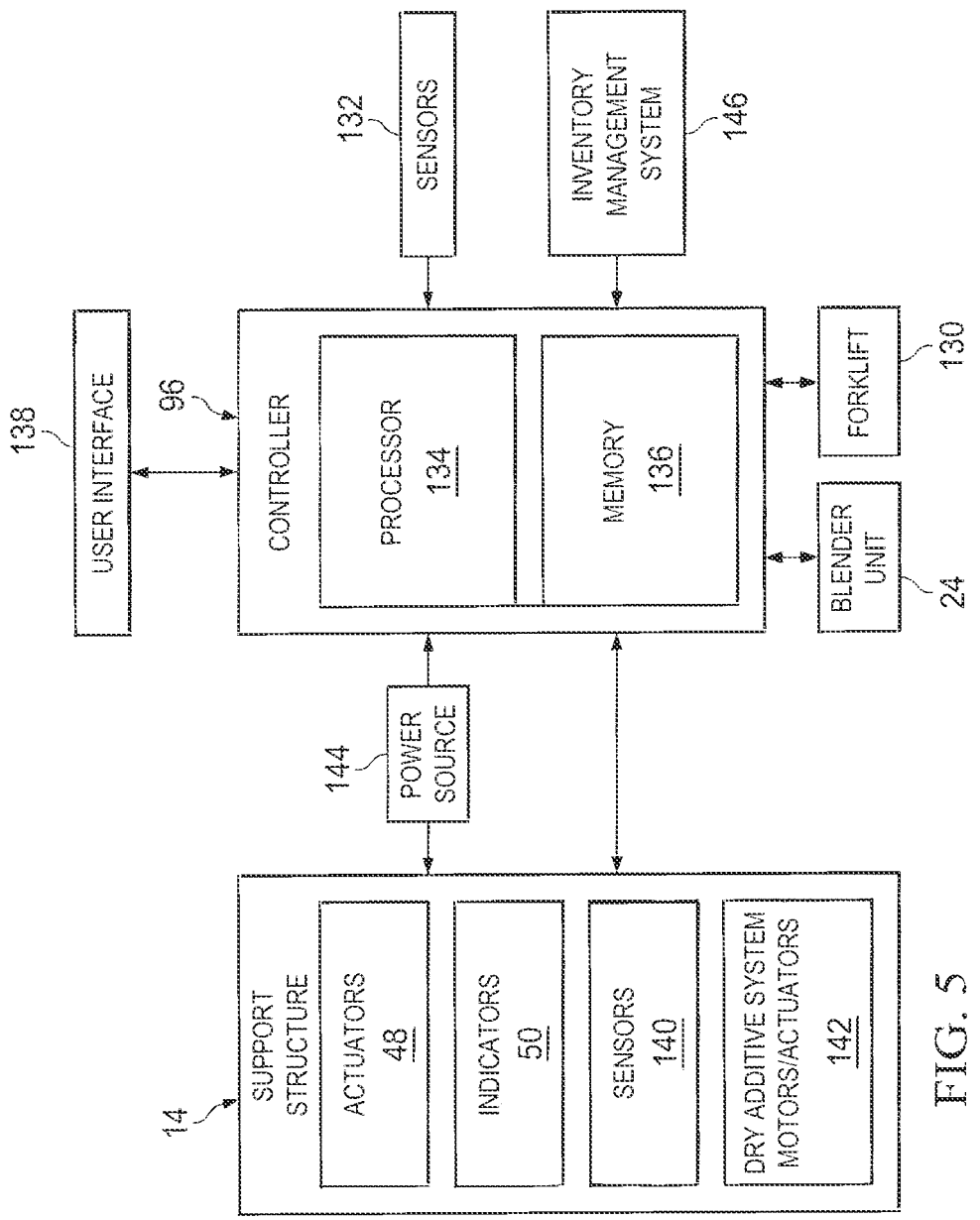
FIG. 5 is a schematic block diagram of an embodiment of a portable support structure with electronics that are communicatively coupled to a control system, in accordance with an embodiment of the present disclosure.

FIG. 5 is a block diagram illustrating various electronic and control components that may be used throughout a well site with the disclosed support structure 14 for discharging bulk material and dry additives. The support structure 14 may include a number of electronic components, and these components may be communicatively coupled (e.g., via a wired connection or wirelessly) to one or more controllers 96 (e.g., automated control system) at the well site. The control system 96 may be communicatively coupled to several other well site components including, but not limited to, the blender unit 24, a hoisting mechanism (e.g., forklift) 130, and various sensors 132.

The control system 96 utilizes at least a processor component 134 and a memory component 136 to monitor and/or control various operations and inventory at the well site. For example, one or more processor components 134 may be designed to execute instructions encoded into the one or more memory components 136. Upon executing these instructions, the processors 134 may provide passive logging of the operational states of one or more components at the well site, as well as the amount, type, and location of bulk material/dry additive at the well site. In some embodiments, the one or more processors 134 may execute instructions for controlling operations of certain well site components (e.g., support structure electronics). This may help to control sequencing of discharge gates on the bulk material containers, metering of dry additive into the blender, and other operations related to material transfer at the well site.

As shown, the controller 96 may be coupled to a user interface 138, which enables an operator to input instructions for execution by the control system 96. The user interface 138 may also output data relating to the operational state of the bulk material/dry additive handling system.

As shown, the control system 96 may be communicatively coupled to a number of sensors 132 disposed on the support structure 14 and/or about the well site. Based on feedback from these sensors 132, the control system 96 may determine when to actuate discharge gates to switch between different bulk material containers and dry additive containers that are positioned on the support structure 14. The control system 96 may also be communicatively coupled to a number of controllable components disposed on the support structure 14, the blender unit 24, and/or the forklift 130. The control system 96 may actuate certain of these controllable components based on sensor feedback.

The support structure 14 may include a number of electronic components such as, for example, the automated actuators 48 described above with reference to FIG. 1. These actuators 48 may be controlled to open and/or close a discharge gate of one or more containers elevated on the support structure 14. The support structure 14 may also include one or more indicators 50 (e.g., indicator lights) disposed on the support structure for providing various information about the operating state of the support structure 14.

In addition, the support structure 14 may include various sensors 140 (e.g., fill level sensors, cameras, load cells, etc.) designed to take measurements and provide sensor feedback to the control system 96. The sensors 140 may be used to detect levels of bulk material and dry additive present in the hopper and/or output chutes, information regarding the number of containers disposed on the support structure 14, as well as the fill level of bulk material or dry additive within the individual containers on the support structure 14. The control system 96 may actuate the discharge gates on different containers with precisely controlled timing based on the received sensor feedback.

Further, the support structure 14 may include one or more dry additive system motors and/or actuators (e.g., controllable gates) 142 used to meter dry additive from one or more dry additive containers on the support structure 14 to the outlet location at a predetermined rate. The control system 96 may actuate these various motors/actuators 142 to provide the desired amount of dry additive for mixing with the bulk material in the blender mixer based on, for example, a known treatment schedule. This may involve adjusting a speed of the motor operating the conveying device of the dry additive outlet system, opening or closing gates at certain locations within the dry additive outlet system, or a combination thereof.

The controller 96, the support structure electronics, or both, may utilize power from an external power source 144, as shown. In other embodiments, the support structure 14 may include its own power source 144 for operating the onboard electronics and sensors.

The sensors 132 may include one or more load cells or bin full switches for tracking a level of bulk material or dry additive in a portable container and indicating whether the container is empty, full, or partially full. Such sensors 132 may be used for any given container, one or more blender hoppers, a silo (not shown), a forklift, or any other component at the well site.

In some embodiments, the controller 96 may be communicatively coupled to an inventory management system 146 that monitors the inventory of bulk material and dry additive on location. Operation of such an inventory management system 146 is described in greater detail in PCT Application No. PCT/US2015/061618. The inventory management system 146 may include a separate control/monitoring system or may be incorporated into the controller 96. The inventory management system 146 may track bulk material inventory and dry additive inventory on location through the use of RFID technology or other identification tracking techniques. Each portable container may feature an identification component (e.g., RFID tag) used to provide an indication of the particle size, bulk volume, weight, type, material, and/or supplier of the bulk material or dry additive present in the container. In some embodiments, the identification components may be rewritable such that the bulk material or dry additive inventory of individual containers can be updated after discharging a portion of its contents at the support structure 14. The inventory management system 146 may be communicatively coupled to an RFID reader disposed in proximity to the containers being moved about the well site.

The controller 96 may provide control signals to the actuators 48 used to open and/or close the container discharge gates with appropriate timing for maintaining a steady supply of bulk material and dry additive to the blender unit 24. In some embodiments, an operator may use the user interface 138 to manually sequence and initiate gate actuations of any desirable bulk material or dry additive containers on the support structure 14. Additional manual override techniques may also be available using, for example, manual hydraulic, pneumatic, or mechanical controls.

Although the present disclosure and its advantages have been described in detail, it should be understood that various changes, substitutions and alterations can be made herein without departing from the spirit and scope of the disclosure as defined by the following claims.

The invention claimed is:

1. A method, comprising:
   receiving a portable container of bulk material on a first bay of a support structure;
   receiving a portable container of dry additive on a second bay of the support structure;

feeding bulk material from the portable container of bulk material directly to a first outlet location via a gravity feed outlet coupled to the first bay;

transferring dry additive from the portable container of dry additive along a routing path to a surge bin located at a second outlet location;

releasing dry additive from the surge bin to the second outlet location; and mixing the bulk material from the first outlet location with the dry additive from the second outlet location in a predetermined concentration;

wherein the bulk material is fed along a second routing path which does not include the surge bin.

2. The method of claim 1, wherein transferring the dry additive comprises feeding the dry additive from the portable container of dry additive to a conveying device via a second gravity feed outlet coupled to the second bay, moving the dry additive to the surge bin via the conveying device, and wherein the surge bin is coupled to a discharge end of the conveying device.

3. The method of claim 2, wherein the conveying device comprises at least one device selected from the group consisting of: a belt conveyor, a feed screw, and an auger.

4. The method of claim 2, wherein comprising metering the dry additive from the second gravity feed outlet to the conveying device via a controllable gate.

5. The method of claim 1, further comprising retaining an amount of the dry additive within the surge bin.

6. The method of claim 1, wherein releasing the dry additive comprises i) metering an amount of dry additive or ii) releasing an amount of dry additive from the surge bin to the second outlet location.

7. The method of claim 1, further comprising delivering the bulk material from the first outlet location to a mixing compartment of a blender, delivering the dry additive from the second outlet location to the mixing compartment of a blender, and mixing the bulk material with the dry additive at the mixing compartment.

8. The method of claim 7, further comprising metering a flow of bulk material from the first outlet location to the mixing compartment via a metering device disposed on the blender.

9. The method of claim 7, further comprising metering a flow of dry additive from the second outlet location to the mixing compartment via a metering device disposed on the blender.

10. The method of claim 1, further comprising selectively actuating discharge gates on the portable container of bulk material and the portable container of dry additive via gate actuators disposed on the first and second bays.

11. The method of claim 1, further comprising outputting a control signal to one or more motors or actuators on the support structure to control a metered flow rate of dry additive to the first outlet location.

12. The method of claim 1 further comprising delivering the bulk material from the first outlet location to a mixing compartment of a blender, delivering the dry additive from the second outlet location to the mixing compartment of the blender, and mixing the bulk material with the dry additive at the mixing compartment.

13. The method of claim 1, further comprising outputting a control signal to one or more motors or actuators on the support structure to control a metered flow rate of dry additive to the second outlet location.

14. A method, comprising:

receiving a portable container of bulk material on a first bay of a support structure;

receiving a portable container of dry additive on a second bay of the support structure;

feeding bulk material from the portable container of bulk material directly to a first outlet location via a gravity feed outlet coupled to the first bay;

transferring dry additive from the portable container of dry additive to a second outlet location along a first routing path having a surge bin configured to retain the dry additive until a desired amount is ready for release to the second outlet location for mixing with the bulk material; and mixing the bulk material from the first outlet location with the dry additive from the second outlet location in a predetermined concentration;

wherein the bulk material is fed along a second routing path which does not include the surge bin.

15. The method of claim 14, further comprising feeding the dry additive from the portable container of dry additive to an inlet of a conveying device via a second gravity feed outlet coupled to the second bay, and moving the dry additive from the inlet to the second outlet location via the conveying device.

16. The method of claim 15, wherein the conveying device comprises at least one device selected from the group consisting of: a belt conveyor, a feed screw, and an auger.

17. The method of claim 15, further comprising metering the dry additive from the second gravity feed outlet to the conveying device via a controllable gate.

18. The method of claim 15, further comprising retaining an amount of the dry additive within the inlet of the conveying device.

19. The method of claim 14, wherein transferring dry additive comprises i) metering an amount of dry additive or ii) releasing an amount of dry additive from an inlet of an conveying device to the second outlet location.

20. A method of controlling an amount of dry additive dispensed from a portable container, comprising:

receiving a portable container of bulk material on a first bay of a support structure;

receiving a portable container of dry additive on a second bay of the support structure;

feeding bulk material from the portable container of bulk material directly to a first outlet location via a first gravity feed outlet coupled to the first bay:

feeding the dry additive from the portable container of dry additive to a conveying device via a second gravity feed outlet coupled to the second bay;

moving the dry additive to a surge bin via the conveying device, wherein the surge bin is located at a second outlet location, and wherein the surge bin is coupled to a discharge end of the conveying device;

measuring, by a control system, an amount of dry additive received within the surge bin from the conveying device;

releasing, by the control system, a prescribed amount of dry additive from the surge bin to the second outlet location; and mixing the bulk material from the first outlet location with the dry additive from the second outlet location in a predetermined concentration;

wherein the bulk material is fed along a routing path not including the surge bin.

21. The method of claim 20, wherein releasing the prescribed amount comprises i) metering the amount of dry additive from the surge bin or ii) releasing a measured amount of dry additive from the surge bin.

\* \* \* \* \*